United States Patent
Wessling et al.

(10) Patent No.: US 11,261,109 B2
(45) Date of Patent: Mar. 1, 2022

(54) SINGLE MODULE, FLOW-ELECTRODE APPARATUS AND METHOD FOR CONTINOUS WATER DESALINATION AND ION SEPARATION BY CAPACITIVE DEIONIZATION

(71) Applicant: DWI—LEIBNIZ-INSTITUT FUR INTERAKTIVE MATERIALIEN E.V., Aachen (DE)

(72) Inventors: Matthias Wessling, Aachen (DE); Youri Gendel, Herzogenrath (DE); Alexandra Rommerskirchen, Herzogenrath (DE)

(73) Assignee: DWI—LEIBNIZ-INSTITUT FUR INTERAKTIVE MATERIALIEN E.V.

( * ) Notice: Subject to any disclaimer, the term of this patent is extended or adjusted under 35 U.S.C. 154(b) by 361 days.

(21) Appl. No.: 15/543,622

(22) PCT Filed: Jan. 15, 2016

(86) PCT No.: PCT/EP2016/000076
§ 371 (c)(1),
(2) Date: Jan. 16, 2018

(87) PCT Pub. No.: WO2016/113139
PCT Pub. Date: Jul. 21, 2016

(65) Prior Publication Data
US 2018/0141834 A1    May 24, 2018

(30) Foreign Application Priority Data
Jan. 16, 2015   (EP) ..................................... 15000108

(51) Int. Cl.
*C02F 1/469*     (2006.01)
*C02F 1/461*     (2006.01)
(Continued)

(52) U.S. Cl.
CPC .......... *C02F 1/4691* (2013.01); *B01D 15/362* (2013.01); *B01D 15/363* (2013.01);
(Continued)

(58) Field of Classification Search
CPC ....................................................... C02F 1/463
See application file for complete search history.

(56) References Cited

U.S. PATENT DOCUMENTS

| | | |
|---|---|---|
| 2,708,658 A | 5/1955 | Rosanberg |
| 3,905,886 A | 9/1975 | Wang |

(Continued)

FOREIGN PATENT DOCUMENTS

| | | |
|---|---|---|
| EP | 1982757 A1 | 10/2008 |
| EP | 2143480 A1 | 1/2010 |

(Continued)

OTHER PUBLICATIONS

Hatzell, Boota, Kumbur, and Gogotsi. Flowable Conducting Particle Networks in Redox-Active Electrolytes for Grid Energy Storage. Journal of The Electrochemical Society (JES) Focus Issue on Electrochemical Capacitors: Fundamentals to Applications. Jan. 9, 2015. vol. 162, No. 5. A5007-A5012. (Year: 2015).*

(Continued)

*Primary Examiner* — Salil Jain
(74) *Attorney, Agent, or Firm* — McDonald Hopkins LLC

(57) ABSTRACT

The present invention relates to a single module, flow-electrode apparatus for continuous water desalination, ion separation and selective ion removal and concentration by capacitive deionization, comprising: a first current collector (1), a first compartment (1') for a flow electrode, a first ion exchange membrane (AEM, CEM), a first liquid-permeable channel (6a) next to the first ion exchange membrane (AEM, CEM), a second ion exchange membrane (CEM, AEM) with a fixed charge opposite to that of the first ion exchange (Continued)

membrane (AEM, CEM) next to the first liquid-permeable channel (6a), a second liquid-permeable channel (6b) next to the second ion exchange membrane (CEM, AEM), a third ion exchange membrane (AEM, CEM) having the same fixed charge as the first ion exchange membrane (AEM, CEM) next to the second liquid-permeable channel (6b), a second compartment (2') for a flow electrode, and a second current collector (2), wherein a fluid (4) containing suspended conductive particles or a mixture of conductive and non-conductive particles or particles made of a mixture of conductive and non-conductive materials (5) is provided in the first and second compartments (1', 2'), acting as the flow electrode, as well as a corresponding method.

12 Claims, 10 Drawing Sheets

(51) Int. Cl.
B01D 15/36 (2006.01)
C02F 103/08 (2006.01)

(52) U.S. Cl.
CPC ...... C02F 1/46114 (2013.01); B01D 2325/08 (2013.01); B01D 2325/42 (2013.01); C02F 2001/46161 (2013.01); C02F 2103/08 (2013.01)

(56) References Cited

U.S. PATENT DOCUMENTS

| | | | |
|---|---|---|---|
| 4,009,088 A | 2/1977 | Hampel et al. | |
| 4,146,455 A * | 3/1979 | McRae | A23C 9/144 204/527 |
| 5,645,703 A * | 7/1997 | Tsai | B01D 61/445 204/538 |
| 2004/0079704 A1 | 4/2004 | Garde et al. | |
| 2010/0065490 A1* | 3/2010 | Balster | B01D 61/46 210/483 |
| 2014/0197034 A1 | 7/2014 | Yaar | |

FOREIGN PATENT DOCUMENTS

| | | |
|---|---|---|
| EP | 2605326 A2 | 6/2013 |
| EP | 2815806 A1 | 12/2014 |
| WO | 2013103236 A1 | 7/2013 |

OTHER PUBLICATIONS

Hatzell, Boota, Kumbur, and Gogotsi. Materials for suspension (semi-solid) electrodes for energy and water technologies. Chemical Society Reviews. Sep. 28, 2015. vol. 44, Iss. 23. pp. 8664-8687 (Year: 2015).*
Hatzell, Hatzell, and Logan. Using Flow Electrodes in Multiple Reactors in Series for Continuous Energy Generation from Capacitive Mixing. Environmental Science & Technology Letters. Dec. 2014. pp. 474-478 (Year: 2014).*
Barber, MacDonald, Yang, and Lu. Capacitive Carbon Electrodes for Electrodialysis Reversal Applications. Conference: 2013 IDA World Congress, At Tianjin, vol. WC13. Oct. 2013 (Year: 2013).*
Hatzell, Iwama, Ferris, Daffos, Urita, Tzedakis, Chauvet, Taberna, Gogotsi, Simon. Capacitive deionization concept based on suspension electrodes without ion exchange membranes. Electrochemistry Communications. vol. 43. Mar. 12, 2014. pp. 8-21 (Year: 2014).*
J.W. Blair & G.W. Murphy. Electrochemical Demineralization of Water with Porous Electrodes of Large Surface Area. Advances in Chemistry; American Chemical Society: Washington, DC, 1960. (Year: 1960).*
Scott, Keith. Electrodialysis <http://www.thermopedia.com/content/721/> (Year: 2011).*
Porada, Weingarth, Hamelers, Bryjak, Presser, and Biesheuvel. Carbon flow electrodes for continuous operation of capacitive deionization and capacitive mixing energy generation. Journal of Materials Chemistry A. Apr. 22, 2014. Issue 24, pp. 9313-9321 (Year: 2014).*
Porada, Lee, Weingarth, Presser. Continuous operation of an electrochemical flow capacitor. Electrochemistry Communication. Sep. 3, 2014. pp. 178-181 (Year: 2014).*
Sung-il Jeon, Jeong-gu Yeo, SeungCheol Yang, Jiyeon Choi and Dong Kook Kim. "Ion storage and energy recovery of a flowelectrode capacitive deionization process" Journal of Materials Chemistry A. 2014, Issue 2, pp. 6378-6383 (Year: 2014).*
Almarzooqi, et al. "Application of Capacitive Deionisation in water desalination: A review," Desalination (2014), pp. 3-15, vol. 342.
Birnhack, et al. "A new post-treatment process for attaining Ca2+, Mg2+, SO42− and alkalinity criteria in desalinated water," Water Research (2007), pp. 3989-3997, vol. 41.
Gendel, et al. "Batch mode and continuous desalination of water using flowing carbon deionization (FCDI) technology," Electrochemistry Communications (2014), pp. 152-156, vol. 46.
Jensen, et al. "Nitrate in Potable Water Supplies: Alternative Management Strategies," Critical Reviews in Environmental Science and Technology (2014), pp. 2203-2286, vol. 44.
Kabay, et al. "Removal of calcium and magnesium hardness by electrodialysis," Desalination (2002), pp. 343-349, vol. 149.
Kim, et al. "Selective removal of nitrate ions by controlling the applied current in membrane capacitive deionization (MCDI)," Journal of Membrane Science (2013), pp. 52-57, vol. 429.
Lahav, et al. "Sustainable removal of ammonia from anaerobic-lagoon swine waste effluents using an electrochemically-regenerated ion exchange process," Chemical Engineering Journal (2013), pp. 214-222, vol. 218.
Lee, et al. "Comparable mono and bipolar connection of capacitive deionization stack in NaCl treatment," Journal of Industrial and Engineering Chemistry (2012), pp. 763-766, vol. 18.
Midaoui, et al. "Optimization of nitrate removal operation from ground water by electrodialysis," Separation and Purification Technology (2002), pp. 235-244, vol. 29.
Oren, et al. "Electrochemical Parametric Pumping," Electrochemical Science and Technology (1978), pp. 869-875, vol. 125, No. 6.
Stodollick, et al. "Electrodialysis of itaconicacid: A short-cut model quantifying the electrical resistance in the overlimiting current density region," Journal of Membrane Science (2014), pp. 275-281, vol. 453.
Zhang, et al. "Phosphate Separation and Recovery from Wastewater by Novel Electrodialysis," Environmental Science & Technology (2013), pp. 5888-5895, vol. 47., No. 11.
Yang et al., "Phosphate Separation and Recovery from Wastewater by Novel Electrodialysis." Environmental Science & Technology. 2013. vol. 47, No. 11, pp. 5888-5895.
Patent Cooperation Treaty (PCT), International Search Report and Written Opinion for Application PCT/EP2016/000076 filed Jan. 15, 2016, dated Mar. 9, 2016 International Searching Authority, EP.

* cited by examiner

--Prior Art--

--Prior Art--

SINGLE MODULE, FLOW-ELECTRODE APPARATUS AND METHOD FOR CONTINOUS WATER DESALINATION AND ION SEPARATION BY CAPACITIVE DEIONIZATION

The present invention relates to a single module, flow-electrode apparatus and a method for continuous water desalination and ion separation by capacitive deionization.

BACKGROUND OF THE INVENTION

Capacitive Deionization for Water Desalination

Development of environmentally friendly and energetically efficient technologies for the desalination of water, in particular seawater, is a great challenge for the supply of safe and sufficient water. Currently, reverse osmosis (RO) is the major technology applied for seawater desalination. Unfortunately, RO has two major drawbacks: an energy demand that still can be reduced potentially and relatively low water recoveries. From a feed water that requires extensive pre-treatment only up to 50% is turned into desalinated water while the remaining reject is disposed as concentrated brine.

Electrochemical processes for water desalination are a very attractive alternative to RO. The Capacitive Deionization process (CDI) utilizes the principle of electro-sorption of ions in the electrical double layer of an electrode-solution interface. When an electric field is applied between two electrodes immersed into an electrolyte solution, anions and cations are attracted by an anode and a cathode that are positively and negatively charged, respectively (AlMarzooqi et al., Desalination 2014, 342, 3-15) and the ions are immobilized onto the electrode surface. Desorption of the ions can occur through short circuiting of the electrodes or charge reversal.

A basic CDI reactor, as shown in FIG. 1, comprises two current collectors 1 and 2 (anode 1 and cathode 2) each covered by a porous electrode 1a and 2a, wherein a channel for the treatment of saline water is formed between said porous electrodes 1a and 2a. Due to their high specific surface area and electrical conductivity, carbon materials such as activated carbon, carbon black, carbon felt, carbon cloth, carbon nanotubes and carbon aerogels are usually applied as porous electrodes 1a and 2a of CDI reactors.

The application of an electrical potential between the anode and the cathode results in an adsorption of anions A and cations C on the surface of the porous electrodes 1a and 2a. The maximum applied potential is limited to a certain value, as higher potentials will result in undesired faradaic processes like electrolytic decomposition of water or electrochemical conversion of dissolved species. According to the equilibrium potential for the oxygen evolution reaction (OER), the maximum cell potential should be limited to 1.23 V. However, higher potentials of up to 2 V are often used due to the relatively high overpotential of OER on carbon electrodes and electrical current resistances associated to electrodes, membranes and water solutions.

A CDI reactor shown in FIG. 1 has to be regenerated once the maximum capacitance of the porous electrodes 1a and 2a has been achieved. This is usually done via short circuiting of the porous electrodes 1a and 2a or by application of a reversal potential. If short circuiting is applied, the energy stored in the porous electrodes 1a and 2a acting as an electrochemical capacitor can be recovered and utilized to decrease operating costs. To use the CDI reactor for desalination in cycles of adsorption and regeneration, the CDI reactor needs to be integrated into an intricate and expensive piping, valve and control system. This is an inherent feature of all adsorption-desorption systems as the feed stream and the desired product streams must be kept separated. Their mixing in dead zones of the piping and valve system would annihilate the achieved prior separation and eventually separation efficiency suffers. It is desirable to avoid such switching processes in the piping system between the adsorption and desorption process, however, a technical solution free of switching between adsorption and desorption cycles is not obvious to the person skilled in the art.

The performance of the capacitive deionization is significantly improved by application of Ion Exchange Membranes (IEM) (AlMarzooqi et al., Desalination 2014, 342, 3-15). Such IEMs are normally of polymeric nature and acidic and/or basic groups are covalently bound as fixed charge groups to the polymer. The ion exclusion functionality of such membranes towards ions of equal charge like the fixed charge is commonly described by the Donnan potential. A simple Membrane Capacitive Deionization (MCDI) reactor, as shown in FIG. 2, comprises two current collectors 1 and 2, porous electrodes 1a and 2a respectively arranged on the current collectors 1 and 2, and anion and cation exchange membranes AEM and CEM are arranged on the surfaces of the porous electrodes 1a and 2a, respectively.

Saline water to be desalinated is passed through the channel present between the anion and cation exchanging membranes AEM and CEM. Application of ion-exchange membranes in CDI results in better desalination efficiency, because of the rejection of co-ions by ion exchange membrane. Similarly to the CDI, regeneration of electrodes in MCDI has to be done via short circuiting or reverse polarization of the electrodes. It also requires extensive piping, valves and process control.

In practical applications a CDI stack comprises a plurality of electrodes and membranes (in case of membrane capacitive deionization). Each electrode might have a direct electrical wiring to the power source. In this case, the electrodes are termed as monopolar. As shown in FIG. 3, alternatively, in a CDI stack only two terminal current collectors 1 and 2 can be wired and all internal electrodes 3 are not wired and are termed bipolar electrodes (Lee at al., Journal of Industrial and Engineering Chemistry 2012, 18(2), 763-766).

In all the above described examples, the apparatus contains stagnant, non-mobile electrodes which remain fixed in the location inside the module. However, an economically advantageous continuous operation of a CDI system with stagnant electrodes is very challenging due to the necessity to periodically regenerate the electrodes applied in the CDI process. A first pseudo-continuous capacitive deionization reactor was developed by Oren and Soffer in 1978 (Oren, Y., & Soffer, A. (1978). Electrochemical Parametric Pumping. *Journal of the Electrochemical Society,* 125(6), 869-875).

FIG. 4 shows four sequential steps applied in "electrochemical parametric pumping" according to said pseudo-continuous capacitive deionization reactor carried out with a basic CDI reactor as shown in FIG. 1. The first step of the process is a charging of the porous electrodes 1a and 2a with ions under applied cell potential. This step is followed by forward pumping of the treated solution from the cell. Regeneration of the porous electrodes 1a and 2a is performed in the third step when short circuiting or reverse potential is applied to the cell. Finally, a concentrate is removed from the cell via backward pumping in the fourth step.

Capacitive Deionization for Wastewater Treatment and Separation of Ionic Species Another challenge that modern science has to cope with is a recovery of ionic species from seawater, wastewater, process water and brines for their reuse. For example, mining of phosphorous-containing minerals is the only source of phosphorous and the natural resources are being depleted at a very fast pace (Zhang et al., 2013, Environmental Science and Technology, 47, 5888-5895). On the other hand, wastewater is recognized today as a renewable source of phosphorous. Finding an efficient way to recover phosphorous from the process and wastewater streams for its reuse is one of the major goals of the environmental science and technology.

Another example is a separation of magnesium. This mineral is essential for agriculture and humans and animals health. For this reason $Mg^{2+}$ must be present in the drinking water. Birnhack and Lahav showed that seawater is a very attractive source of $Mg^{2+}$ for the drinking water produced by desalination (Birnhack an Lahav, Water Research 2007, 41 (17), 3989-97).

Moreover, finding economically feasible and environmentally friendly removal techniques of certain pollutants from water is a great challenge as well. The presence of nitrate in drinking water became a great concern in the United States (Jensen et al., Critical Reviews in Environmental Science and Technology 2014, 44, 2203-2286). Removal of ammonium ions from the agricultural wastewater is another example. Effluents from piggeries contain concentrations of ammonia nitrogen of up to 1500 mgN/l. In many cases this wastewater cannot be accepted for the treatment in conventional wastewater treatment plants due to extremely high concentrations of nitrogen. Consequently, very intensive research is conducted today to find economically and environmentally feasible technologies for the removal of ammonia from agricultural and other types of wastewater (Lahav et al., Chemical Engineering Journal 2013, 214-222).

Capacitive deionization can be also applied for the selective removal of such ionic species from the treated water. For example, selective separation of nitrate from solutions that contain chloride and nitrate anions using MCDI was reported by Kim et al. (Journal of Membrane Science 2013, 429, 52-57). The selectivity for nitrate removal was achieved by optimization of the applied current density.

On the other hand, it is also possible to remove ions selectively via an application of selective ion exchange membranes in capacitive deionization. This approach was successfully applied in electrodialysis for the electrochemical separation of nitrates from ground water (Midaoui et al., Separation and Purification Technology 2002, 29, 235-244), for the recovery of phosphates from wastewater (Zhang et al., Environmental Science and Technology 2014, 47, 5888-5895), and for the removal of calcium and magnesium (Kabay et al., Desalination 2002, 149, 343-349). Separation of itaconic acid using electrodialysis is an example for the separation of organic ionic species using ion selective membranes (Stodollick et al., Journal of Membrane Science 2014, 453, 275-281).

Challenges of CDI Technology

The main challenge that the development of CDI has to cope with is to make the technology feasible for the desalination and selective separation of ionic species from brackish water, seawater, brine streams from chemical processes and alike. At the current state of the CDI technology with stagnant electrodes, its application is limited due to the relatively low ion adsorption capacity of modern stagnant carbon electrodes (maximum of about 15 mg/g). High salt concentration as in seawater would require very large amounts of electrode materials and, consequently, large overall reactor volumes are required.

Capacitive Deionization with Flowing Carbon Electrodes

In order to overcome the difficulty to establish the continuous CDI process capable of water desalination, moving electrodes were suggested. For example, according to US 2014/0197034 A1, a "Capacitive Conveyor-Belt Desalination" is disclosed. In this system electrodes mounted on belts are recirculated between charging (desalination) and discharging (regeneration) compartments to continuously desalinate the water.

Recently, a new CDI approach that utilizes flowing carbon electrodes was developed (EP 2 605 326 A2 and WO 2013/103236 A1). The new process was termed "Flow electrode Capacitive Deionization" (FCDI).

The principle of FCDI is illustrated in FIG. 5. The basic cell comprises two fluids 4 containing suspended conductive particles 5 (in the following also termed "flow electrodes"), two current collectors 1 and 2 with engraved flow channels, anion and cation exchange membranes AEM and CEM applied on the current collectors 1 and 2, respectively, wherein the electrolyte flows through an insulating spacer 6 positioned between AEM and CEM. The flow electrodes 4 are water based suspensions of porous conductive particles 5 having a high surface area (for example, activated carbon). Once the conductive particles 5 touch the charged current collector 1 or 2, they also become charged and adsorb ions A and C, respectively, having the opposite charge that pass from the treated water through the anion and cation exchange membranes AEM and CEM, respectively. In a single pass mode three streams (i.e. two flow electrodes 4 and the saline water) pass the cell only once. In this way, a continuous process of water desalination can be carried out. The regeneration of the flow electrodes 4 is disclosed to be carried out via mixing of the two flow electrodes 4 followed by the solid/liquid separation of the conductive particles 5 from the resulting brine water. The concentrated phase of flow electrode can be reused by mixing it with some part of the desalinated feed water. However, prior to mixing it still contains interstitial salt solution. This as well as the use of some of the produced desalinated water hampers the efficacy of the processes disclosed in EP 2 605 326 A2 and WO 2013/103236 A1. Thus, the need of regeneration of the used flow electrodes 4 by mixing and separating from the brine using additional systems reduces the energetic efficiency due to extra pumping, mixing and separation processes, each requiring energy input.

To render the water desalination using the FCDI process fully continuous, electrochemical regeneration of the flow electrode using a secondary FCDI module was recently developed (Gendel et al., Electrochemistry Communications 2014, 46, 152-156). FIG. 6 shows the general principle of this system. In fact, the process is carried out by two FCDI modules, wherein a first FCDI module is used for desalination (desalination module) and a second FCDI module is used for the regeneration of flow electrodes 4 and simultaneous production of higher concentrated brine (regeneration module). Flow electrodes 4 are recirculated continuously between the two modules and the saline water is split between them into desalinated water and concentrated saline water streams. Anions A and cations C adsorbed on the conductive particles 5 of the flow electrode 4 in the desalination module are discharged into the concentrated saline water stream, because the conductive particles 5 reverse their polarity in the regeneration module. These regenerated conductive particles 5 return back into the desalination module to pick up more ions from the desalinated water stream. Operation with a NaCl solution having a concentration of 1 g/L has shown >99% desalination: also water recovery of at least 90% is possible in this continuous FCDI system. The system does not require switching from an adsorption to a regeneration mode, as it is required in all other systems. Furthermore, it also does not require separate separation and mixing steps.

However, the system depicted in FIG. 6 suffers from three serious drawbacks. First, it requires a second cell causing additional costs. Second, recirculation of flow electrodes 4 inevitably consumes a lot of energy because slurries have significantly higher viscosities than the particle free solvent alone. Third, operating two FCDI modules for the desalination process will result in a high volume of the system.

In view of the above, the objective problem underlying the present invention is to provide an improved apparatus and method for continuous water desalination and/or selective separation and concentration of chemicals from water using the FCDI technology.

DETAILED DESCRIPTION

According to the present invention the above object is achieved by a single module, flow-electrode apparatus for continuous water desalination and/or selective separation and concentration of chemicals from water by capacitive deionization and a method for continuous water desalination and/or selective separation and concentration of chemicals from water by capacitive deionization. Further embodiments of the present invention are set out in the dependent claims.

Specifically, the present invention provides a single module, flow-electrode apparatus for continuous water desalination, ion separation and selective ion removal and concentration by capacitive deionization, comprising: a first current collector, a first compartment for a flow electrode, a first ion exchange membrane, a first liquid-permeable channel next to the first ion exchange membrane, a second ion exchange membrane with a fixed charge opposite to that of the first ion exchange membrane next to the first liquid-permeable channel, a second liquid-permeable channel next to the second ion exchange membrane, a third ion exchange membrane having the same fixed charge as the first ion exchange membrane next to the second liquid-permeable, a second compartment for a flow electrode, and a second current collector, wherein a fluid (4) containing suspended conductive particles or a mixture of conductive and non-conductive particles or particles made of a mixture of conductive and non-conductive materials (5) is provided in the first and second compartments (1', 2'), acting as the flow electrode.

Figure 1:
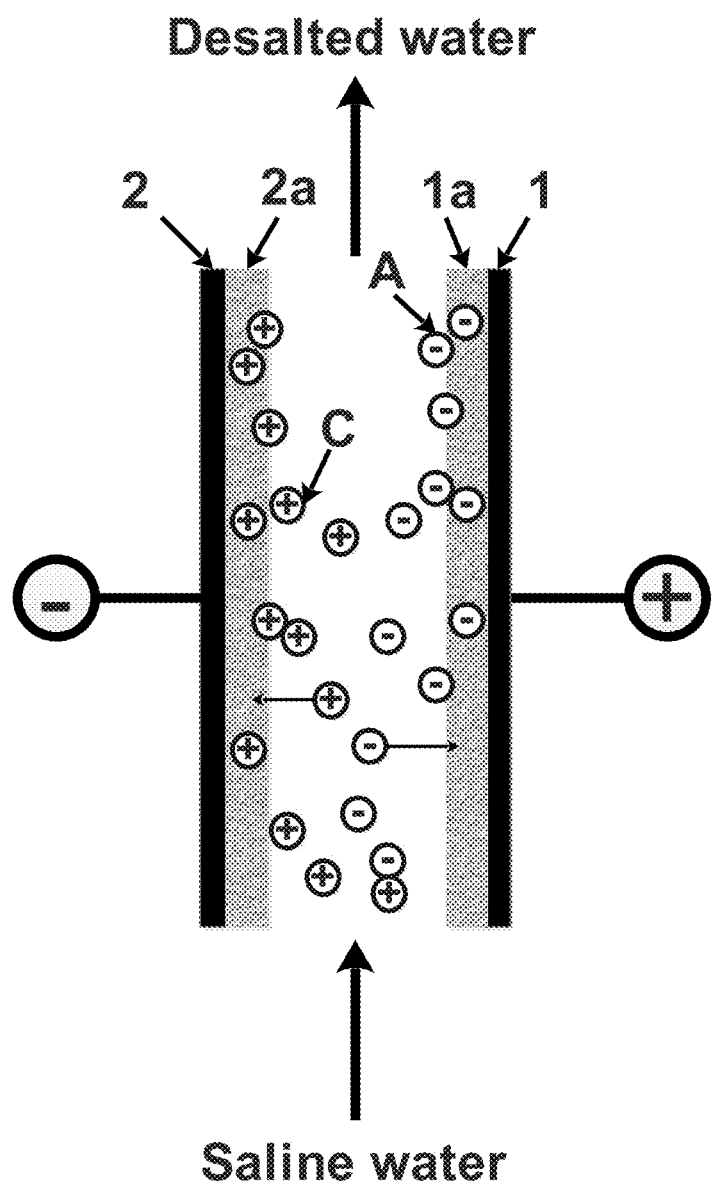
FIG. 1 is a schematic of a basic CDI reactor.
Figure 2:
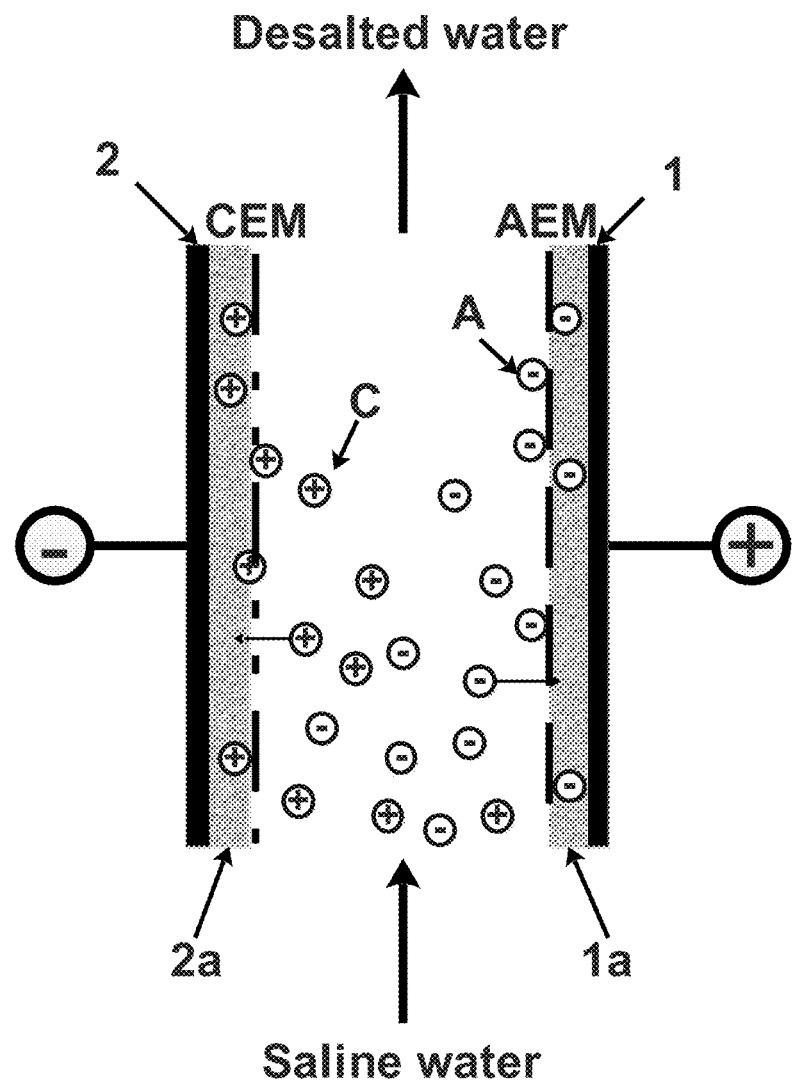
FIG. 2 is a schematic of a simple membrane capacitive deionization reactor.
Figure 3:
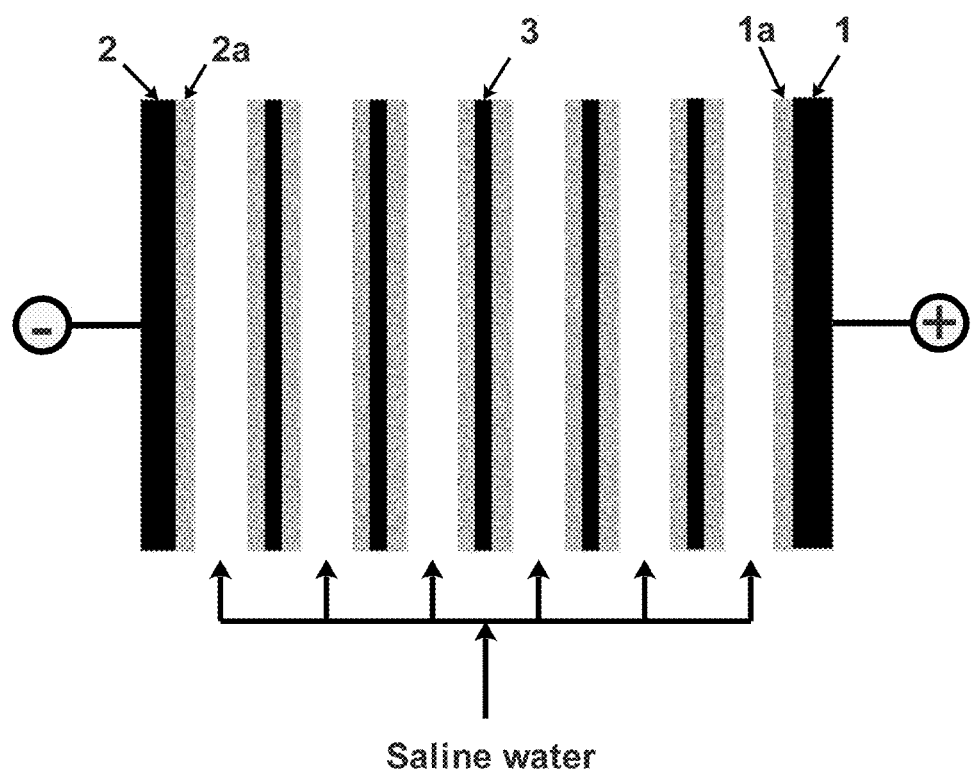
FIG. 3 is a schematic of an embodiment of a CDI stack.
Figure 4:
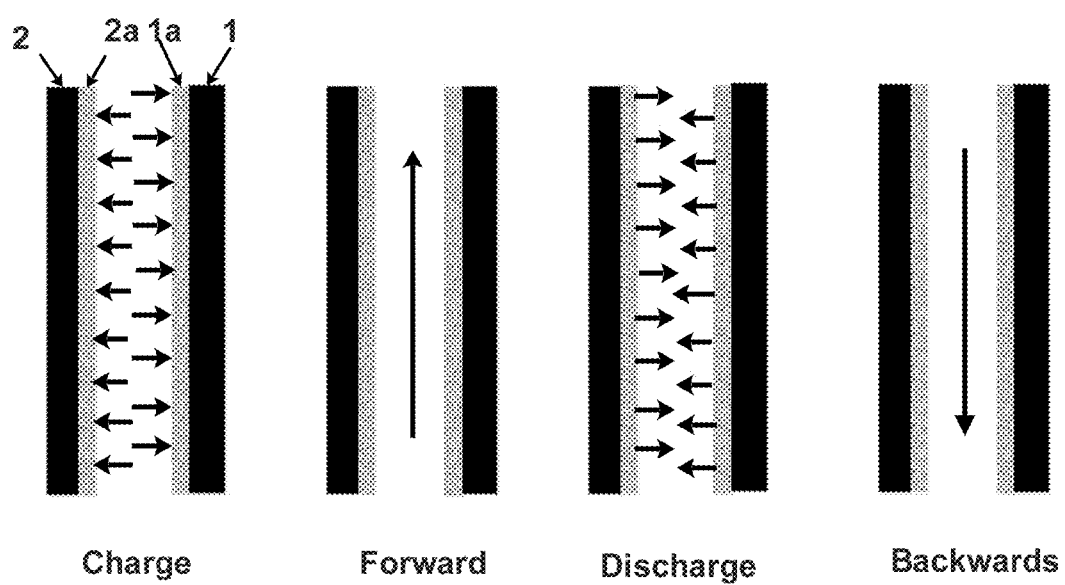
FIG. 4 is a schematic depicting four sequential steps applied in electrochemical parametric pumping carrying out a pseudo-continuous CDI reactor with the basic CDI reactor.
Figure 5:
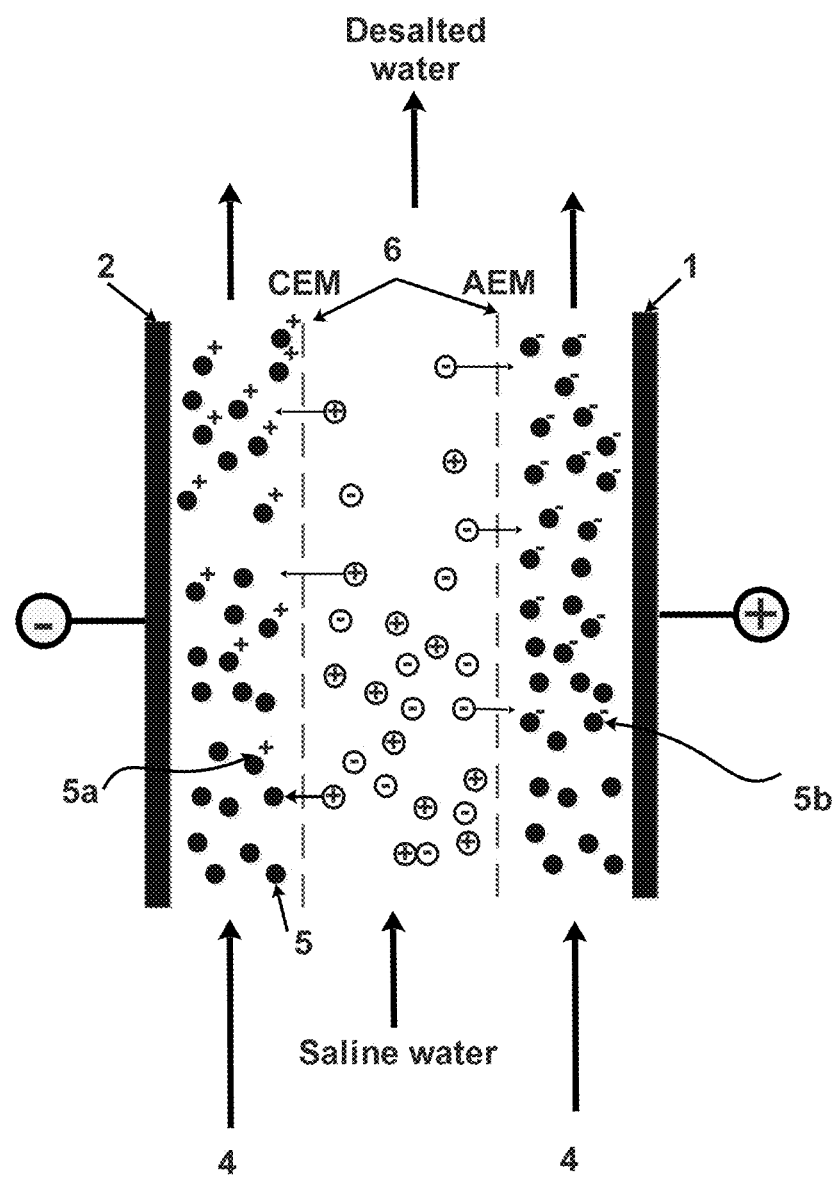
FIG. 5 is a schematic of a cell illustrating a flow electrode CDI process.
Figure 6:
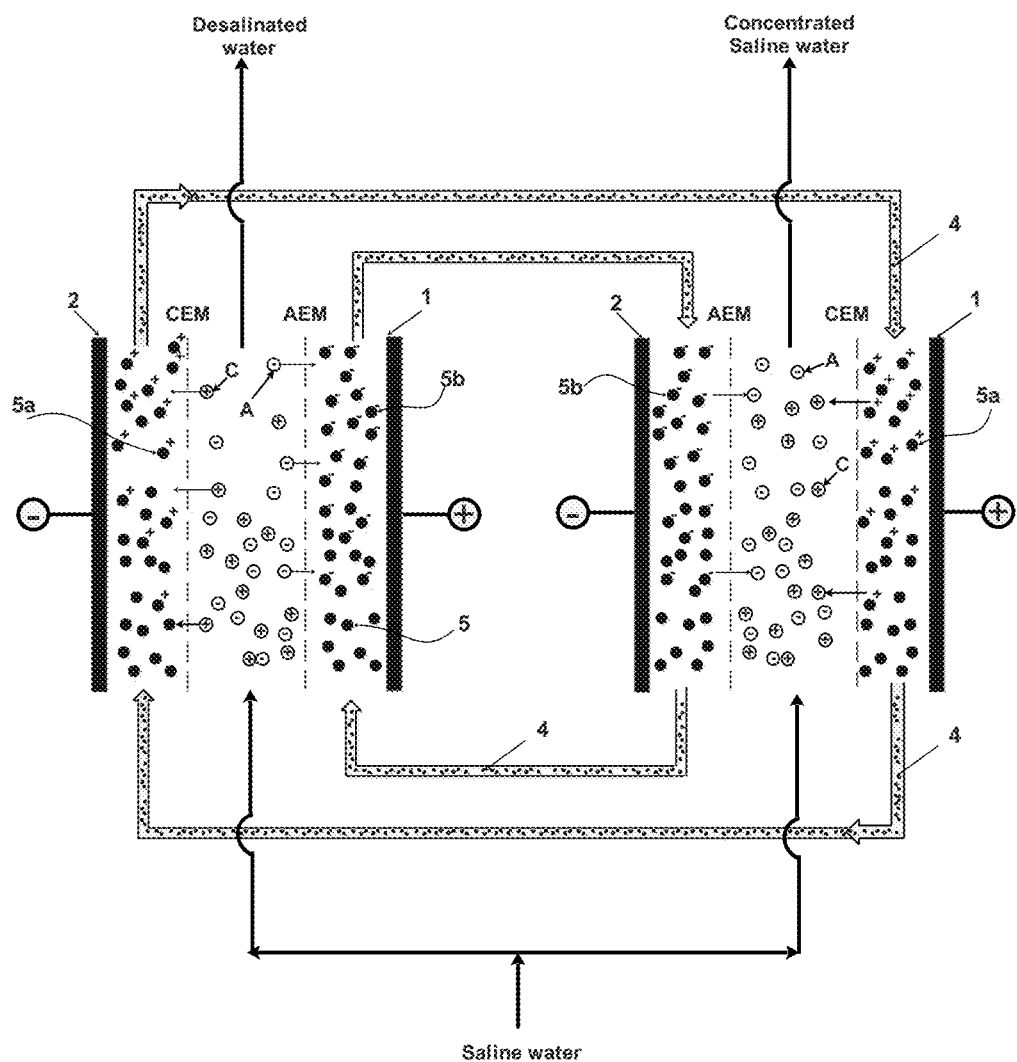
FIG. 6 is a schematic showing continuous water desalination using the flow electrode CDI process and system.
Figure 7:
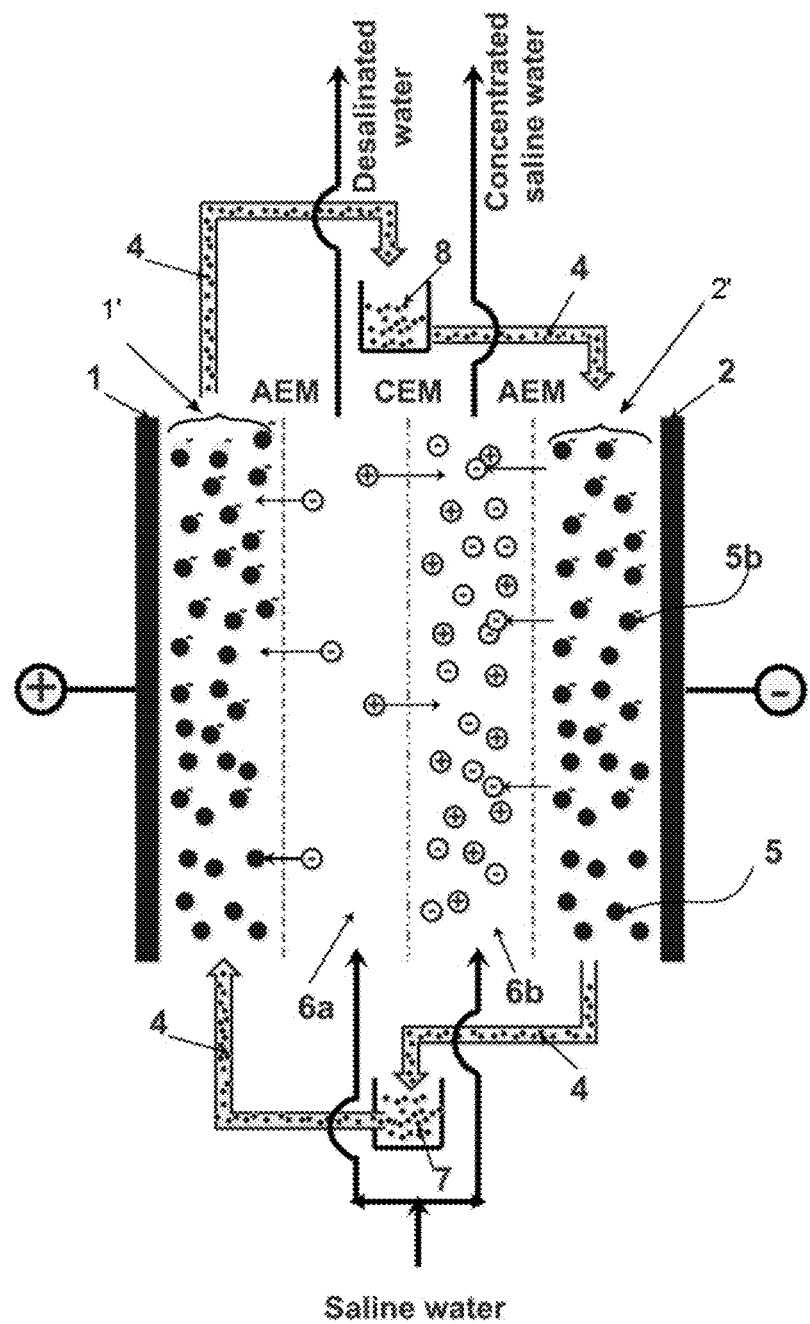
FIG. 7 is a schematic showing a flow electrode CDI system based on a single flow-electrode and a single module in accordance with an embodiment of the invention.

Thus, the present invention relates to a FCDI system/apparatus based on a single flow-electrode and a single module (i.e. two monopolar electrodes in a single cell) as exemplified in FIG. 7.

The feed water is split into two streams for parallel desalination and concentration. However, in this case the streams are fed into two water compartments located in the same module, which are separated by an IEM. One type of ions (anion or cation) is directly drawn from the diluate compartment to the concentrate compartment, while the oppositely charged type of ions are drawn into the first flow-electrode compartment, where the ions are adsorbed on the surface of the carbon particles suspended in an aqueous electrolyte solution. This flow-electrode is recirculated to a flow-electrode compartment on the opposite site of the module, which has an equal potential as the adsorbed ions, and thus the ions are desorbed into the concentrate compartment. The fixed charge of the IEM placed next to the flow-electrode compartment is equal, while the IEM separating the two water compartments has an opposite fixed charge. Theoretically it does not matter whether anion or cation exchange membranes are chosen to be placed next to the flow-electrodes.

Preferably, the fluid (4) is a suspension of 1% (w/v) to 40% (w/v) carbon based particles, selected from activated carbons, graphene based and CNTs based materials, in a water-containing liquid.

Preferably, the fluid (4) may also contain non-conducting particles having molecular recognition functions as to complex small organic acids, bases or amphoteric molecules. Such non-conductive particles maybe redox-responsive such that they can be switched between the two electrode compartments. They can complex in the flow electrode compartment with the small organic acids, bases or amphoteric molecules as long as they pass the ion exchange membranes. It is apparent to the person skilled in the art that the mechanism allows for the separation of smaller from larger organic acids, bases and amphoteric molecules depending on the properties of the ion exchange membranes and the redox-active non-conductive particles. Such ion-exchange membranes may be of the homogeneous or heterogeneous porous type.

To the person skilled in the art it is also apparent that such flow and cell configuration maybe of large scale for industrial separations as well as small microfluidic and analytical flow cell configurations.

According to one embodiment of the present invention, the charge of the first current collector is a negative charge, the charge of the second current collector is a positive charge, the first and third ion exchange membranes are anion exchange membranes and the second ion exchange membrane is a cation exchange membrane.

According to another embodiment of the present invention, the charge of the first current collector is a positive charge, the charge of the second current collector is a negative charge, the first and third ion exchange membranes are cation exchange membranes and the second ion exchange membrane is an anion exchange membrane.

The ion exchange membranes can be tailored selective to only let specific species of anions or cations pass, such as for example monovalent ions and thus can serve to desalinate water, separate different species or kinds of ions and/or serve to selectively and/or essentially non-selectively remove or concentrate ions.

Preferably, the ion exchange membranes each have a thickness of 0.01 to 1 mm.

More preferably, the ion exchange membranes each have a thickness of 0.05 to 0.8 mm, still more preferably of 0.1 to 0.7 mm. Usually, the first and second current collectors as well as the first to third ion exchange membranes each have a sheet or plate form.

The first and second liquid-permeable channels (electrolyte flow path) can be formed by the ion exchange membranes being spaced apart from each other. Alternatively, the first and second liquid-permeable channels (electrolyte flow path) can be formed by liquid-permeable spacers so that the electrolyte flows through said spacers formed between AEM and CEM. The first and second liquid-permeable channels when formed by spacers (e.g. ion-conducting or insulating spacers), for example by means of polypropylene mesh, sandwiched between the ion exchange membranes, usually have a sheet or plate form. According to another preferred embodiment of the present invention, the first and second liquid-permeable channels are formed by a profiled surface of the ion exchange membranes. Ion exchange membranes having a profiled surface and which can be used for the apparatus of the present invention are described in e.g. EP 1 982 757 A1.

The first and second liquid-permeable channels may have a thickness of 0.05 to 1 mm. More preferably, the first and second liquid-permeable channels have a thickness of 0.08 to 0.8 mm, still more preferably of 0.1 to 0.7 mm.

According to a preferred embodiment of the present invention, the first and second current collectors comprise an electrically conductive plate, wherein the first and second compartments for a flow electrode are carved into the electrically conductive plate. The carving may be carried out by any suitable method, like, for example, milling or eroding.

The electrically conductive plate can be made of a material selected from the group consisting of metal, graphite, graphite foil and composite materials made of polymeric binder and conductive particles. The latter one in fact can be processed into electrodes with flow fields hot-pressed into them.

Just as an example, the electrically conductive plate may be an epoxy-impregnated graphite plate.

Figure 9:
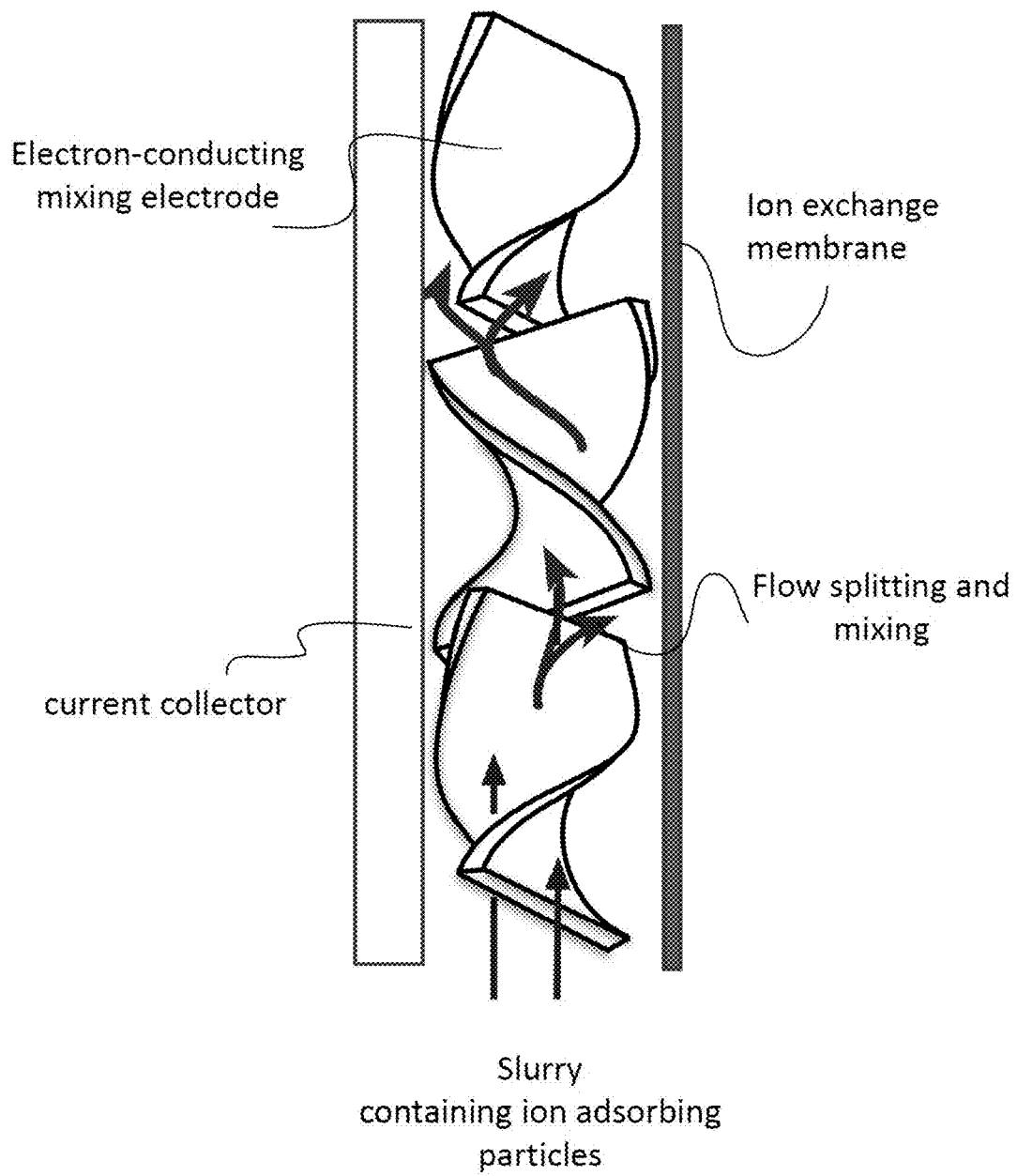
FIG. 9 shows an embodiment of the flow electrode CDI system comprising a conductive material in the form of a three-dimensionally shaped element.

According to a preferred embodiment of the present invention, an additional conductive material in the form of a wire, a mesh, a felt or an open-porous foam-like structure or three dimensionally shaped elements/structures (as shown in FIG. 9) is placed inside or next to the first and second compartments for a flow electrode. Particularly, said additional conductive material is present in the form of a three-dimensionally conductive electrode that equalizes the respective slurry flow. While such static mixers are known to improve mixing of unmixed fluids, their use as static mixing electrode with electron-conductive slurries in the context of the current invention is unique. Such structures may be optimized in geometry as to (a) tailor and control the flow and the hydrodynamics to promote mixing and contact of the electron-conductive and flow organizing structures and the adsorptive particles in contact with the current collector, as well as (b) to facilitate the transport of the adsorptive particles to the surface area of the ion exchange membranes adjacent to the current collectors. Such a geometry is shown in FIG. 9. Any other shape of such a structure may also be adopted. Such flow equalization elements as shown in FIG. 9 are known in the art; cf. EP 2 143 480 A1. However, their property of electron-conductivity is a novel element of this invention.

Such elements/structures (also called flow equalization elements or static mixers) can be formed by a plurality of three-dimensional flow equalizing elements arranged between two ion exchange membranes (AEM, CEM), i.e. within the first and/or second liquid-permeable channels, or more particularly arranged between the current collector and ion exchange membrane, i.e. within the first and/or second compartment, and extending in parallel with each other and with the flow direction of the electrolyte, wherein such flow equalization element extends in the longitudinal direction substantially in parallel with the flow direction of the electrolyte.

Alternatively, the first and second current collectors can be placed in or next to a non-conductive plate made of for example plastic or ceramic materials, wherein the first and second compartments for a flow electrode are carved into the non-conductive material, and wherein the first and second current collectors are wire, mesh, felt, open-porous foam-like or three-dimensionally shaped elements/structures placed in or next to the first and second compartments for a flow electrode.

According to a preferred embodiment of the present invention, two units are provided for breaking the continuity of the flow electrode flowing from the first compartment for a flow electrode to the second compartment for a flow electrode and flowing from the second compartment for a flow electrode to the first compartment for a flow electrode. Preferably, the two units are drip chambers.

The present invention relates to a stack for continuous water desalination, ion separation and selective ion removal and concentration by capacitive deionization, wherein the stack comprises an apparatus as described above, wherein the apparatus includes additional pairs of ion exchange membranes in an alternating manner including one additional liquid-permeable channel per added ion exchange membrane.

In addition, the present invention relates to a method for continuous water desalination, ion separation and selective ion removal and concentration by capacitive deionization using the apparatus according to the present invention, comprising the steps of:

(1) applying a voltage or current between the first and second current collectors, (2) continuously supplying feed water containing ionic components to the first and second liquid-permeable channels, (3) supplying a fluid, also called flow electrode, containing suspended conductive particles or a mixture of conductive and non-conductive particles or particles made of a mixture of conductive and non-conductive materials into the first and second compartments for a flow electrode, wherein the fluid is continuously circulated in the first and second compartments for a flow electrode such that the fluid leaving the first compartment for a flow electrode is introduced in the second compartment for a flow electrode, and the fluid leaving the second compartment for a flow electrode is introduced in the first compartment for a flow electrode, (4) continuously discharging from the first liquid permeable channel a water having a lower concentration of the ionic components compared to the water introduced in the first liquid permeable channel, and (5) continuously discharging from the second liquid permeable channel a water having an increased concentration of the ionic components compared to the water introduced in the second liquid-permeable channel.

With respect to the particles used in the slurry, i.e. for the flow electrode, carbon based particles from activitated carbons, graphene based and CNTs based materials are preferred. However, any other particle complying with properties such as (a) large ion-accessible specific surface area, (b) high electro-chemical stability, (c) fast ion mobility within the pore network, (d) high electronic conductivity, (e) low contact resistance between particle and current collector, and (f) good wetting behaviour will be applicable as well. Potential materials are listed in Porada, S., Zhao, R., van der Wal, A., Presser, V., & Biesheuvel, P. M. (2013). Review on the science and technology of water desalination by capacitive deionization. *Progress in Materials Science*, 58(8), 1388-1442. However, the materials are not limited to these.

Typically, the voltage applied to the first and second current collectors is from −2 to 2 V, preferably from −1.5 to 1.5 V, more preferably from −1.3 to 1.3 V.

According to further preferred embodiment of the present invention, the fluid is a suspension of 1% (w/v) to 40% (w/v), preferably 2% (w/v) to 30% (w/v), more preferably 3% (w/v) to 25% (w/v), even more preferably 5% (w/v) to 20% (w/v) particles in a water-based liquid. The water-based liquid may include electrolytes, in particular selected from inorganic and organic salts and mixtures thereof, and/or from inorganic and organic acids and mixtures thereof. Ionic liquids containing water may also be applicable. It is appreciated by a person skilled in the art that large colloidal, polymeric or biomacromolecular matter may also be present, but will not be able to pass the membrane due to size rejection.

During continuous operation of such system, a desalination rate of a 1 g/L NaCl solution of up to 70% can be achieved at water recoveries of up to 80%. Also very good current efficiencies can be achieved: in case of 80% water recovery, the current efficiency is 0.93. Such degrees of desalination can be tuned by adjusting, for example, residence time and membrane area.

In the following, embodiments of the apparatus and method according to the present invention are described with reference to FIGS. 7 and 8. It should be noted that the materials, dimensions and other features used to characterize and describe this embodiment are not specifically limited, but may be replaced and/or combined with other materials, dimensions and features according to the above-described general and preferred embodiments.

As shown in FIG. 7, the desalination apparatus comprises a first current collector 1 (anode current collector) and a second current collector 2 (cathode current collector), which are made of a conductive plate, mesh or foam. Preferably, the anode current collector 1 and the cathode current collector 2 comprise graphite.

In the surface of the anode current collector 1 and the cathode current collector 2 facing the first and second compartments (1', 2') for a flow electrode, respectively, a flow channel is provided. The flow channel can be formed, for example, by machining (milling) or other suitable methods.

The first and second compartments (1', 2') are configured such that it is possible to circulate the fluid 4 containing, for example, suspended conductive particles 5, also called flow electrode, in the first and second compartments (1', 2').

Figure 8:
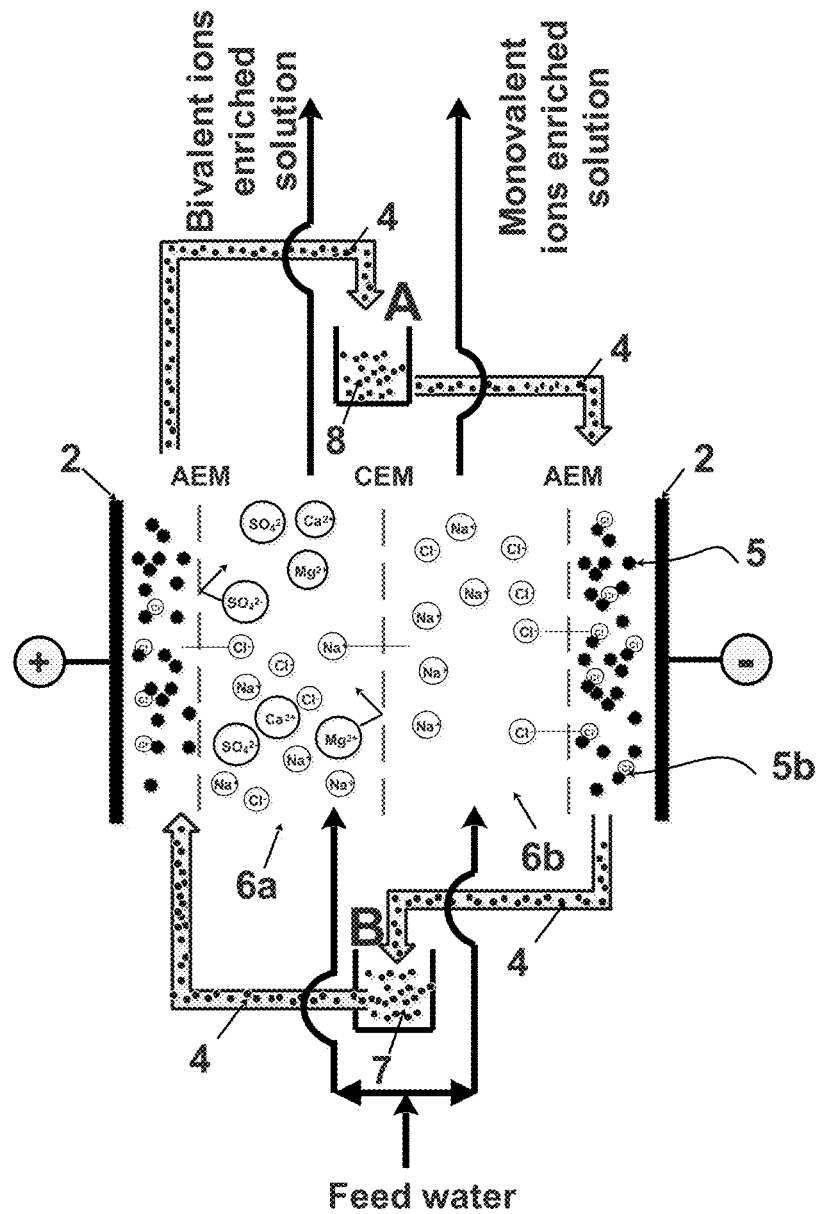
FIG. 8 is a schematic of an embodiment of a flow electrode CDI system using selective ion exchange membranes in accordance with an embodiment of the invention.

Two additional units 7 and 8, like, for example, drip chambers, as shown in FIGS. 7 and 8 can be provided in the apparatus in order to prevent a direct electrical current leaking between the anode and cathode current collectors 1 and 2 through the fluid 4. In these units the liquid and therefore the charge continuity of the fluid 4 is broken. If leak currents are not significant in the process performed, the chambers are not necessary.

Furthermore, an anion exchange membrane AEM is applied on the anode current collector 1 and the cathode current collector 2, respectively, on the surface having the first and second compartments (1', 2'), respectively, formed.

A first liquid-permeable channel 6a is formed on the anion exchange membrane AEM on the anode current collector 1 side, and a second liquid-permeable channel 6b is formed on the anion exchange membrane AEM on the cathode current collector 2 side. The first and second liquid-permeable channels 6a and 6b each provide a channel (compartment) for flowing saline water (feed water with ionic component(s)) therethrough. In the following the channel on the anode current collector 1 side is designated as "first liquid-permeable channel", and the channel on the cathode current collector 2 side is designated as "second liquid-permeable channel". The first and second liquid-permeable channels 6a and 6b can be made as known to the person skilled in the art, for example by spacers (ion-conducting spacers or insulating spacers) like in EP 2 605 326 A2, e.g. polypropylene mesh, etc.

Finally, between the first and second liquid-permeable channels 6a and 6b, a cation exchange membrane CEM is present.

According to the apparatus as shown in FIG. 7, desalination of water is preferably done using ion exchange membranes not specifically tailored for ion selectivity.

In the alternative, according to the present invention, separation of more complex mixtures of electrolytes (ionic species) can be achieved by using selective ion exchange membranes. A corresponding embodiment is shown in FIG. 8, where separation of bivalent and monovalent ions (i.e. $Mg^{2+}$, $Ca^{2+}$, $SO_4^{2-}$ and $Na^+$, $Cl^-$) using the apparatus and method according to the present invention are carried out. In this case, selective separation of bivalent ions is achieved due to the application of monovalent-ion-selective membranes. In these membranes selectivity is achieved via the rejection of ions with valence higher than 1 (or lower than −1) by the membrane, while monovalent ions pass the membrane selectively. The selective separation can also be achieved using a membrane which selectively transports only specific types of ions. For example, the application of nitrate selective membranes in the apparatus according to the present invention can be used to separate nitrate ions from other monovalent and multivalent ions and produce a stream which is enriched in nitrate (concentrated stream) and/or solely contains nitrate ions. It should be noted that the present embodiment is not limited to the ionic species listed above. This principle can generally be applied for the selective removal, rejection and/or concentration of specific ionic species (electrolytes). The selectivity of the membranes can be tuned to be mono-valent ion selective over bi-valent ions or vice versa. Such membranes may be made from one ion-exchange material, maybe a composite of ion exchange materials, may be supported through a netting material or even by a support membrane. Ion exchange materials are known in the art as polyelectrolytes or macromolecules that obtain a charge upon contact with an ionic solution.

It should be noted that according to the present invention the feed streams supplied to the liquid-permeable channels 6a and 6b (spacers like ion-conducting spacers or insulating spacers) may have the same composition or different compositions.

Furthermore, concerning the arrangement of the anion and cation exchange membranes AEM and CEM as described above, it should be noted that the same can also be arranged in a reverse manner, i.e. a cation exchange membrane CEM can be applied on the first current collector 1 and the second current collector 2, respectively, having the first and second compartments (1', 2'), respectively, for the flow electrode, and between the first and second liquid-permeable channels 6a and 6b, an anion exchange membrane AEM can be present. This is valid for both selective and anion and cation exchange membranes which selectivity is not tailored.

The apparatus and method according to the present invention are fully continuous in respect to the production of a diluted stream and a concentrated stream and regeneration of the flow electrodes. The apparatus according to the present invention comprises only one module, wherein both diluted and concentrated streams are produced. Furthermore, the apparatus according to the present invention has low energy consumption and it can be used for the fabrication of a stack made of a plurality of desalinating/deionisating and concentrating units, which can be achieved by either stacking the unit as described above or by introducing additional pairs of ion exchange membranes in an alternating manner including one additional liquid-permeable channel per added ion exchange membrane.

Therefore, the apparatus and method according to the present invention provide a considerable improvement over apparatuses and methods for desalination/deionisation known in the prior art.

The following specific example is provided for further illustrating the present invention and does not limit the scope of the present invention.

EXAMPLE

In order to further demonstrate the beneficial effects of the apparatus and method according to the present invention, an apparatus for continuous water desalination by capacitive deionization according to the present invention and as shown in FIG. 7 was constructed and operated as follows.

The first and second current collectors were made of epoxy impregnated graphite plates (supplied by Müller & Rössner GmbH & Co. KG, Troisdorf, Germany) with an engraved flow channel, serving as compartment for the flow electrode, of 3 mm width, 3 mm deep and 189 cm overall length. A fluid containing suspended conductive particles (flow electrode) having a volume of 100 ml and containing 5% (w/v) of activated carbon (Norit® D10, supplied by Cabot Corporation, Alpharetta, Ga., USA) was recirculated between the apparatus and a magnetically stirred storage container at a flow rate of 60 ml/min. Two anion exchange membranes (Fumasep® FAS-PET-130/ED-100, supplied by FuMA-Tech Gesellschaft für funktionelle Membranen und Anlagentechnologie mbH, Bietigheim-Bissingen, Germany) were respectively placed on the surface including the flow channels of the first and second current collectors. As shown in FIG. 7, the apparatus had two liquid-permeable spacers, serving as first and second liquid-permeable channels, one for desalination and thus a production of a diluted stream, and one for the production of a concentrated NaCl solution (brine) as the concentrated stream. Saline streams were passed through the two 0.5 mm thick liquid-permeable spacers (ED-100 spacer, supplied by FuMA-Tech Gesellschaft für funktionelle Membranen und Anlagentechnologie mbH, Bietigheim-Bissingen, Germany) separated by a cation exchange membrane (Fumasep® FKS-PET-130/ED-100, supplied by FuMA-Tech Gesellschaft für funktionelle Membranen and Anlagentechnologie mbH, Bietigheim-Bissingen, Germany). The effective surface area of the anion and cation exchange membranes was 121 cm$^2$. A voltage of 1.2 V was supplied to the first and second current collectors by an Autolab PGSTAT101 potentiostat (supplied by Metrohm Schweiz AG, Zofingen, Switzerland) in such a way that the first current collector is positively charged. Sodium chloride solution (1 g NaCl/l) was used as saline water. The water recovery (calculated as the ratio in percent between desalination stream and concentrated NaCl solution stream flow rates) was varied in different experiments between 50 to 90%. This means that 50 to 90% of the overall flow supplied to the apparatus was supplied to the first liquid-permeable and was thus desalinated, while 50 to 10% of the overall flow supplied to the module was supplied to the second liquid-permeable and was thus concentrated in the apparatus. Thus, the tested recovery ratios ranged between 50:50 and 90:10 diluted:concentrated stream. The flow rate of the desalination stream was varied between 0.67 ml/min to 2.5 ml/min. Electrical conductivity of the influents and effluents of the apparatus were monitored using an Inolab 720 pH/conductivity meter (supplied by WTW GmbH, Weilheim, Germany).

Figure 10:
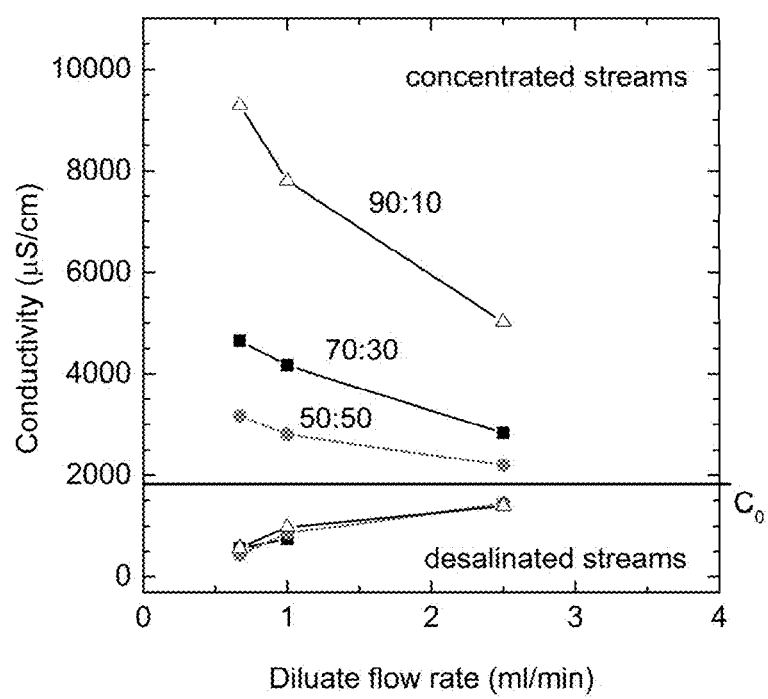
FIG. 10 is a graph showing experimental conductivity data of diluted and concentrated streams measured within experiments performed at different flow rates of the desalination stream as well as the recovery ratios.

FIG. 10 shows the conductivity data of the diluted and concentrated streams measured within experiments performed at different flow rates of the desalination stream as well as the recovery ratios.

According to FIG. 10, an increase in water recovery from 10 to 90% does not have an influence on the desalination. The main parameter that governs the desalination rate is the residence time of the desalination stream in the desalination treatment unit of the system as shown as Diluate Flow Rate: a large Diluate Flow Rate represents a small residence time. Consequently, the best desalination (approximately 75%) was achieved at the lowest tested flow rate of the diluted stream (i.e. 0.67 ml/min). Through adaquate adjustment of Diluate Flow Rate and specifications of the apparatus according to the present invention high desalination and concentration degrees can be realized.

The invention claimed is:

1. A method for continuous water desalination, ion separation and selective ion removal and concentration by capacitive deionization using an apparatus comprising:
   a first current collector,
   a first compartment for a flow electrode,
   a first ion exchange membrane,
   a first liquid-permeable channel next to the first ion exchange membrane,
   a second ion exchange membrane with a fixed charge opposite to that of the first ion exchange membrane next to the first liquid-permeable channel,
   a second liquid-permeable channel next to the second ion exchange membrane,
   a third ion exchange membrane having the same fixed charge as the first ion exchange membrane next to the second liquid-permeable channel,
   a second compartment for a flow electrode, and
   a second current collector,
   wherein a fluid containing suspended conductive particles or a mixture of conductive and non-conductive particles or particles made of a mixture of conductive and non-conductive materials is provided in the first and second compartments, acting as a flow electrode, the method, comprising the steps of:

applying a voltage or a current between the first and second current collectors, continuously supplying feed water containing ionic components to the first and second liquid-permeable channels, supplying said fluid into the first and second compartments for a flow electrode, wherein the fluid is continuously circulated in the first and second compartments for a flow electrode such that the fluid leaving the first compartment for a flow electrode is introduced in the second compartment for a flow electrode, and the fluid leaving the second compartment for a flow electrode is introduced in the first compartment for a flow electrode, continuously discharging from the first liquid permeable channel a water having a lower concentration of the ionic components compared to the water introduced in the first liquid permeable channel, and continuously discharging from the second liquid permeable channel a water having an increased concentration of the ionic components compared to the water introduced in the second liquid-permeable channel, wherein the water desalination, ion separation and selective ion removal and concentration by capacitive deionization occurs concurrently with regeneration of the flow electrodes and within a single cell.

2. The method according to 1, wherein the fluid is a suspension of 1% (w/v) to 40% (w/v) carbon based particles, selected from activated carbons, graphene based and CNTs based materials, in a water-containing liquid.

3. The method according to claim 1, wherein the charge of the first current collector is a negative charge, the charge of the second current collector is a positive charge, the first and third ion exchange membranes are anion exchange membranes and the second ion exchange membrane is a cation exchange membrane.

4. The method according to claim 1, wherein the charge of the first current collector is a positive charge, the charge of the second current collector is a negative charge, the first and third ion exchange membranes are cation exchange membranes and the second ion exchange membrane is an anion exchange membrane.

5. The method according to claim 1, wherein the first, second, and third ion exchange membranes each have a thickness of 0.01 to 1 mm.

6. The method according to claim 1, wherein at least one of the first or second liquid-permeable channels are formed by a spacer.

7. The method according to claim 1, wherein at least one of the first or second liquid-permeable channels are formed by a profiled surface of the first, second, or third ion exchange membranes.

8. The method according to claim 1, wherein the first and second current collectors comprise an electrically conductive plate, wherein the first and second compartments for a flow electrode are carved into the electrically conductive plate, wherein the electrically conductive plate is made of a material selected from the group consisting of metal, graphite, graphite foil and composite materials made of polymeric binder and conductive particles.

9. The method according to claim 1, wherein an additional electrically conductive material in the form of a wire, a mesh, a felt, or an open-porous structure is placed inside or next to the first and second compartments for a flow electrode.

10. The method according to claim 9, wherein said additional electrically conductive material is present in the form of a three-dimensionally shaped conductive electrode.

11. The method according to claim 1, wherein the first and second current collectors are placed in or next to a non-conductive plate, made of plastic or a ceramic material, wherein the first and second compartments for a flow electrode are carved into a non-conductive current collector material, and wherein the first and second current collectors are wire, mesh, felt, or open-porous structures or three-dimensionally shaped structures made of conductive materials placed in or next to the first and second compartments for a flow electrode.

12. The method according to claim 1, wherein two units are provided for breaking the continuity of the flow electrode flowing from the first compartment for a flow electrode to the second compartment for a flow electrode and flowing from the second compartment for a flow electrode to the first compartment for a flow electrode, wherein the two units are drip chambers.

* * * * *